United States Patent [19]

Wilkins et al.

[11] Patent Number: 4,537,179

[45] Date of Patent: Aug. 27, 1985

[54] POLYMER-GEL COVERED SOLAR ENERGY COLLECTOR AND STORAGE UNIT

[76] Inventors: Ebtisam S. Wilkins; Michael G. Wilkins, both of 643 Fairview Rd. NW., Albuquerque, N. Mex. 87107

[21] Appl. No.: 549,015

[22] Filed: Nov. 4, 1983

Related U.S. Application Data

[63] Continuation of Ser. No. 273,594, Jun. 15, 1981, abandoned.

[51] Int. Cl.$^3$ .................... B01J 11/18; C09K 3/00; F24J 3/02
[52] U.S. Cl. .................... 126/415; 252/382; 422/38; 422/43
[58] Field of Search .................... 526/303.1, 304, 307; 126/415; 422/43; 252/382

[56] References Cited

U.S. PATENT DOCUMENTS

| | | | |
|---|---|---|---|
| 3,306,870 | 2/1967 | Eilers et al. | 524/423 X |
| 4,107,156 | 8/1978 | Sunamori et al. | 526/304 X |
| 4,138,992 | 2/1979 | Shaffer | 252/315.1 X |

FOREIGN PATENT DOCUMENTS 236337 11/1961 Australia .................... 126/415

*Primary Examiner*—Richard D. Lovering
*Attorney, Agent, or Firm*—Mathew L. Kalinowski

[57] ABSTRACT

An aqueous gel comprising water and a cross-linked polyacrylamide provides a transparent, thermally insulating cover for a solar pond. Heat losses from the top of the pond to the atmosphere due to convection currents are minimized as well as losses due to evaporation. Advantage is taken of convection currents to maximize heat extraction efficiency.

5 Claims, No Drawings

POLYMER-GEL COVERED SOLAR ENERGY COLLECTOR AND STORAGE UNIT

This application is a continuation of application Ser. No. 273,594 filed June 15, 1981, now abandoned.

This invention relates to the collection and storage of solar energy in a solar pond covered with a transparent, thermally insulating layer of a polymeric gel.

Solar ponds are well-known means of collecting and storing thermal energy. In a conventional solar pond a shallow body of water, confined in a tank with black bottom and sides, is deployed to receive sunlight. Typically, the pond can be one to three meters deep and one hundred or more square meters in surface area. A disadvantage of ponds utilizing water as the absorbing liquid is that heating of the water produces convection currents which bring absorbed heat to the surface where it is dissipated into the air.

It has been found that convection currents can be inhibited and heat losses at the surface can be reduced by addition of various salts to the water to form a saturated solution and to establish a density gradient that increases with depth. In operation of such ponds, heat collected in the most dense bottom layer is extracted by circulating the layer through a heat exchanger; the cold brine is then re-injected into the bottom layer.

The prior art discloses additional improvements to minimize convection currents and the attendant heat losses. Shaffer, U.S. Pat. No. 4,138,992 discloses that convection in a solar pond is inhibited by raising the viscosity of the liquid by adding gelling agents such as water soluble polymers. Further improvement can be attained by the addition of baffles to form a cell structure in the pond. Loeb et al., U.S. Pat. No. 4,244,351 discloses a non-convecting pond in which the brine consists essentially of a mixture of sodium carbonate and sodium bicarbonate. A cover may be used over the pond to impede carbon dioxide transfer across the surface of the solution. Holt, U.S. Pat. No. 4,249,518 discloses a method and apparatus for maintaining a substantially constant salt gradient in a non-convecting salt density gradient solar pond.

Experience over the years with salt gradient ponds has revealed a number of disabilities. Such ponds contain large quantities of salt and therefore impose environmental pollution hazards. Water continually evaporates especially in arid climates, thus requiring frequent replenishment. And, to maintain a downwardly increasing density gradient it is necessary to continuously add concentrated brine at the bottom and fresh water at the top. Since the pond is open to the air, dirt and other debris can accumulate and sink to the bottom or remain in suspension which makes the pond less transparent and decreases the energy collection efficiency. A variety of fluid dynamic instabilities can occur which can perturb the density stratification. For example, relative motion of two layers during withdrawal of fluid for heat extraction can create potentially destructive oscillations at the interface of the layers.

Accordingly, it is an object of this invention to provide a solar pond that reduces or eliminates the above-listed disabilities of prior-art ponds.

It is a further object of this invention to provide a solar pond whose energy collection and storage efficiency are not dependent upon a stable density gradient and a non-convecting configuration.

These and other objects will become apparent as description of the invention proceeds.

The solar pond of this invention comprises a container deployed to receive sunlight; a transparent fluid within the container to absorb solar thermal energy; means for withdrawing heat from the fluid; and a substantially transparent layer of an aqueous polymer gel floating on and covering the fluid in amount and thickness sufficient to decrease substantially heat losses therefrom. A preferred gel comprises water, a gel-forming amount of a polyacrylamide polymer, and a cross-linking agent in amount sufficient to effect cross linking of the polyacrylamide polymer to produce the insoluble polymeric gel.

The preferred fluid for the pond is water because of its high heat capacity, transparency, and low heat conductivity. Brine solutions can also be employed, for example aqueous solutions of water soluble salts such as $NaCl$, $MgCl_2$, $KNO_3$, $NH_4NO_3$, and the like in concentrations up to the saturation point.

Suitable polyacrylamide polymers for forming the gel are water-dispersible, substantially linear polymers of acrylamide having a molecular weight of from about one million to about ten million. Such polymers are prepared by a variety of procedures known in the art and are readily available commercially. As especially suitable polymer is a homopolymer of acrylamide which is essentially non-ionic, has a molecular weight of approximately five million to six million, and has the additional properties listed in Table I.

TABLE I

| Polyacrylamide Homopolymer | |
|---|---|
| Appearance | White powder |
| Viscosity, 0.1% solution, cps Brookfield | 1.8–2.2 |
| Residual monomer, % by weight | 0.5 maximum |
| Water insolubles, % by weight | 0.5 maximum |
| Carboxylic (as acrylic acid) % by weight | 1.0 maximum |
| Screen analysis, % by weight on 20 mesh screen through 100 mesh screen | 12 maximum 30 maximum |
| Volatiles, % by weight | 14 maximum |
| Sodium sulfate, % by weight | 3.5–5.5 |
| pH, 1% solution | 6.0–6.5 |
| Sodium sulfite or bisulfite, % by weight | None |

To form the gel from about 1 to about 5% by weight of the polymer is dispersed in water or in brine. Greater amounts of polymer can be used to increase the rigidity of the gel. A cross-linking agent is added with stirring at ambient temperature in amount of from about 1.0 to about 2.0% by weight based on the weight of the polymer. Particularly suitable cross-linking agents are diethylamine and glyoxal. The time for formation of the gel can be controlled by adjusting the amount of added cross-linking agent. Typically, with about 1.5% of cross-linking agent, gelation is completed in about 24 hours. Alternatively, the gel can be formed by polymerizing acrylamide monomer in aqueous solution in the presence of a cross-linking agent such as N,N'-methylene bisacrylamide, divinyl benzene, divinyl ether, and the like.

The above-described gel is floated onto a solar pond in amount sufficient to provide a transparent, thermally insulating cover. It is understood that a partially cross-linked gel of relatively low viscosity can be produced and pumped onto the surface of the pond where in situ cross linking to the final, high viscosity gel can take place.

DESCRIPTION OF THE PREFERRED EMBODIMENTS

The invention is further described by reference to the following procedures and examples.

EXAMPLE 1

To 100 parts of a saturated aqueous solution of NaCl was added at ambient temperature with stirring 3.8 parts by weight of the above-described homopolymer of acrylamide having a molecular weight of approximately five million to six million. To this dispersion was added 0.056 parts by volume (about 1.5% by weight based on the weight of the added polymer) of diethylamine. At the end of 24 hours a gel formed which had excellent transparency and stability up to 130° C.

EXAMPLE 2

To 100 parts of a saturated solution of NaCl was added:
0.08 parts by weight of the polyacrylamide of Example 1
1.68 parts by volume of a 40% aqueous solution of glyoxal
0.25 parts by volume of a 40% aqueous solution of sodium hypochlorite
1.68 parts by volume of a 4.76% aqueous solution of trisodium phosphate
0.01 parts by weight of a dilute aqueous solution of the ultraviolet absorber, 2-hydroxy-4-methoxy-5-sulfobenzophenone
At the end of 24 hours a gel formed which was water-white and stable up to 130° C.

EXAMPLE 3

To 70 liters of water at ambient temperature was added with stirring 4 kilograms of acrylamide monomer, 30 grams of N,N′-methylene bisacrylamide, and 25 ml of dimethyl aminopropionitrile. To this solution was added 240 grams of ammonium persulfate dissolved in 6 liters of water. At the end of 1 hour 76 liters of gel formed which was water-white and stable up to 130° C.

The physical properties of the gels prepared in the above examples are set forth in the following table:

| Gel | $C_p$ | $\rho$ | $\mu$ | K |
|---|---|---|---|---|
| Example 1 | 1.02 | 1.2 | $3 \times 10^4$ | 0.32 |
| Example 2 | 0.86 | 1.2 | 1752 | 0.33 |
| Example 3 | 1.01 | 1.2 | $3 \times 10^4$ | 0.33 |

$C_p$ = heat capacity, cal/gm/°C.
$\rho$ = density, gm/ml$^3$
$\mu$ = viscosity, centipoise at 25° C.
K = thermal conductivity, BTU/hr/°F./ft From the tabulated data it is clear that the gels possess high heat capacity, high viscosity, and low thermal conductivity which properties are required for solar pond application.

In typical usage, a one-foot layer of the gel is placed on top of a three-foot depth of brine in a container 16 feet in diameter and four feet deep. The thickness of the gel layer can vary from a few inches up to well over one foot. Variation in the thickness of the gel layer and the depth of the brine can be utilized to provide the desired collection and storage characteristics of the pond.

The pond is exposed to solar radiation which passes through the transparent polymer gel and is primarily absorbed on the bottom. The liquid in the bottom is free to convect; convection of the liquid in the solar pond of this invention is advantageous in that heat extraction is maximized. Heat is extracted by known means, for example by circulating the hot liquid through an external heat exchanger. Alternatively, heat can be retained in the pond to effect sterilization of drinking water. Temperatures of 45° C. and higher are readily attained in the pond at which temperatures undesirable microorganisms are effectively eliminated, thereby providing potable water.

The polymer gel on top of the liquid prevents heat losses from the top to the atmosphere and seals the liquid against intrusion of dust, debris, and foreign objects that would impair its heat collection efficiency. The polymer gel also prevents heat and liquid losses by evaporation and heat heat losses due to wind action.

The surface of the gel is readily maintained clean and transparent by periodic flushing with water to remove accumulated dust and debris. The gels are resistant to ultraviolet radiation and are stable to heat and biodegradation, and thus provide extended periods of usefulness in solar pond applications.

Although this invention has been described with particular reference to certain preferred embodiments thereof, it is understood that modifications and variations can be effected within the spirit and scope of the appended claims. It is intended that all the material contained in the above description shall be interpreted in an illustrative and not in a limiting sense.

What is claimed is:
1. A solar pond comprising:
   (a) a container deployed to receive solar radiation;
   (b) a transparent heat-absorbing fluid within the container freely flowing therein and heated principally by convection currents induced by solar radiation;
   (c) means for withdrawing heat from the fluid; and
   (d) a transparent, cross-linked, aqueous polymer gel covering the fluid in amount and thickness sufficient to decrease substantially heat losses therefrom.
2. The solar pond of claim 1 wherein the gel comprises sodium chloride brine, a gel-forming amount of a polyacrylamide polymer, and a cross-linking agent selected from the group consisting of diethylamine, glyoxal, and N,N′-methylene bisacrylamide in amount sufficient to effect said cross-linking to produce said gel.
3. The solar pond of claim 2 wherein the gel has a polyacrylamide polymer content of from about 5 to about 10% by weight and the cross-linking agent is N,N′-methylene bisacrylamide in amount of from about 0.5 to about 1.0% by weight based on the weight of the polymer.
4. The solar pond of claim 2 wherein the polyacrylamide polymer has a molecular weight within the range of from about five million to about six million and the cross-linking agent is diethylamine present in amount of from about 1 to about 2% by weight based on the weight of the polymer.
5. The solar pond of claim 2 wherein the polyacrylamide polymer has a molecular weight within the range of from about five million to about six million and the cross-linking agent is glyoxal present in amount of from about 50 to about 100% by weight based on the weight of the polymer.

* * * * *